United States Patent [19]

Wang et al.

[11] Patent Number: 5,243,769
[45] Date of Patent: Sep. 14, 1993

[54] PROCESS FOR RAPIDLY DRYING A WET, POROUS GEL MONOLITH

[75] Inventors: Shiho Wang, Ventura; Fikret Kirkbir, Newbury Park; Satyabrata Raychaudhuri, Agoura; Arnab Sarkar, West Hills, all of Calif.

[73] Assignee: Yazaki Corporation, Tokyo, Japan

[21] Appl. No.: 904,858

[22] Filed: Jun. 26, 1992

[51] Int. Cl.$^5$ .............................. F26B 3/04
[52] U.S. Cl. ........................... 34/27; 34/218
[58] Field of Search .............. 34/15, 51, 26, 202, 34/92, 27, 218

[56] References Cited

U.S. PATENT DOCUMENTS 4,776,867 10/1988 Onorato et al.
4,786,618 11/1988 Shoup
4,849,378 7/1989 Hench et al.

Primary Examiner—Henry A. Benner
Attorney, Agent, or Firm—Pretty, Schroeder, Brueggemann & Clark

[57] ABSTRACT

A process and apparatus are described for rapidly drying a wet, porous gel monolith of glass or ceramic, at subcritical temperatures without inducing any cracking of the gel. The wet gel in immersed in a liquid solvent in a chamber, and the liquid solvent is then heated and expelled from the chamber. Further heating, with or without the presence of a flowing inert gas, fully dries the wet gel. When an inert gas is used, the gas is delivered to the chamber with a controlled solvent partial vapor pressure, to correspondingly control the driving force for drying the gel.

18 Claims, 1 Drawing Sheet

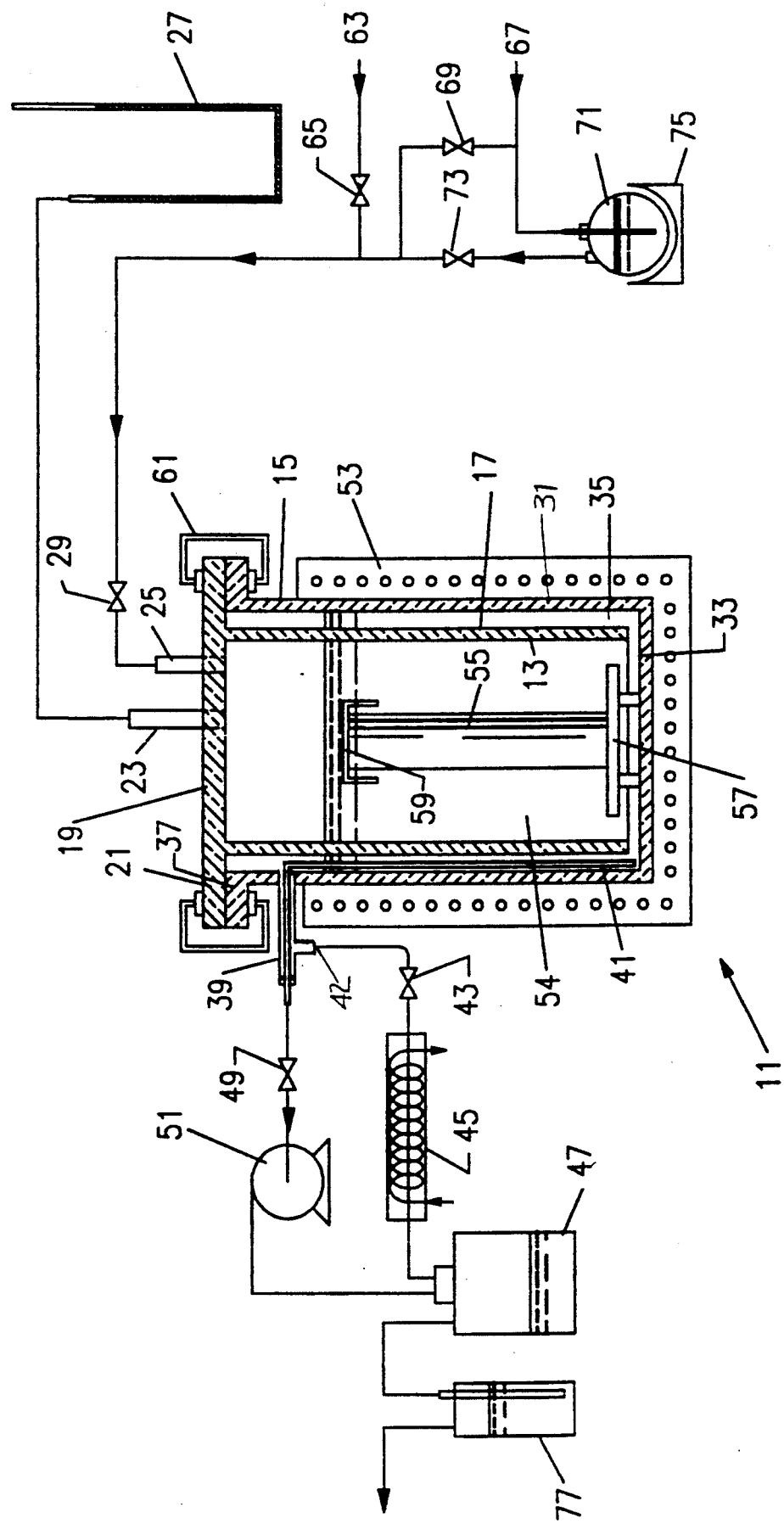

PROCESS FOR RAPIDLY DRYING A WET, POROUS GEL MONOLITH

BACKGROUND OF THE INVENTION

This invention relates generally to sol-gel processes for producing dry gel monoliths and, more particularly, to drying processes and apparatus for rapidly drying wet gel monoliths without inducing cracking.

High-purity glass and ceramic components typically are fabricated either by a melting of solid raw materials or by vapor deposition. Melting of solid raw materials is a generally effective technique, but difficulty is encountered in maintaining purity, due to the inherent presence of impurities in the raw materials and due to recontamination from processing containers at the high melting temperatures. In addition, energy costs due to high temperature processing can sometimes be excessive, and finishing costs to produce components of the desired final shapes also can be excessive. Vapor deposition likewise is generally effective, but very expensive due to a relatively low (e.g., 50%) material collection efficiency, a high investment cost in processing and pollution control equipment, and slow processing rates.

High-purity ceramic components are typically fabricated by processes such as solid extrusion and colloidal casting. Like high-purity glass fabrication processes, these processes also require high temperature processing and the articles fabricated are limited in composition, homogeneity and purity.

Research has recently been conducted into the use of sol-gel processes for fabricating high-purity monolithic articles of glass and ceramic. In such processes, a desired solution, i.e., sol, of glass- or ceramic-forming compounds, solvents, and catalysts is poured into a mold and allowed to react. Following hydrolysis and condensation reactions, the sol forms a porous matrix of solids, i.e., a gel. With additional time, the gel shrinks in size by expelling fluids from the pores. The wet gel is then dried in a controlled environment, to remove fluid from its pores, and it is then densified into a solid monolith.

Advantages of the sol-gel procedss include chemical purity and homogeneity, flexibility in the selection of compositions, processing at relatively low temperatures, and producing monolithic articles close to their final desired sol-gel process has generally proven to be extremely difficult to use in producing monoliths that are large and free of cracks. These cracks arise during the final drying step of the process, and are believed to result from stresses due to capillary forces in the gel pores. Efforts to eliminate the cracking problem present in sol-gel monoliths have been diverse. However, the problem of cracking has not previously been eliminated without sacrificing one or more of the benefits of the process, as listed above.

One technique for eliminating cracking during the final drying step of the glass or ceramic gel is to dry the gel above its critical temperature, with a suitable fluid in an autoclave. Above the critical temperature and pressure, there is no vapor/liquid interface in the pores and thus no capillary force exists. The fluids are removed from the pores while in this condition, and a dry gel is thereby obtained. Although this technique is effective, it can be dangerous and it requires relatively expensive equipment.

Another technique for eliminating cracking during the final drying step is to increase the pore size distribution by using various catalysts. However, this approach has not proven to be particularly successful for large monoliths, because no catalyst is believed to have been found to produce average pore sizes above about 100 Angstroms.

Yet another technique for eliminating cracking during the final drying step is to add colloidal silica particles to the sol, which increases the average pore size and correspondingly increases the solid matrix's strength. Although this technique is generally effective, the presence of colloidal silica particles sacrifices the gel's otherwise inherent homogeneity, thus restricting the range of compositions that can be utilized. In addition, devitrification spots can be created, if mixing of the colloidal silica particles is not perfect.

Yet another technique for eliminating cracking during the final drying step is to add drying control additives to the sol, to produce a more uniform pore size distribution and thereby strengthen the gel matrix. These drying step. Although generally effective in eliminating cracking, this technique generally produces monoliths having a large number of bubbles.

Yet another technique for eliminating cracking during the final drying step is to hydrothermally age the gel prior to drying, which increases the average pore size in the gel and correspondingly decreases the capillary stresses encountered during drying. Although this technique is generally effective, the aging step increases the time and the equipment cost for drying gels and thus increases the cost of the final product.

Still another technique for eliminating cracking during the final drying step is to heat the gel to a subcritical temperature in a chamber having several pinholes to allow the evaporating fluid to escape. Although generally effective, this technique can be very slow, requiring months to complete. The drying rate can be increased by increasing the area of the pinholes, but this frequently leads to cracking.

It should, therefore, be appreciated that there is a need for an improved drying process for producing large glass and ceramic monoliths that are substantially free of cracks, without sacrificing other benefits attendant to the sol-gel process, such as low relative expense, chemical purity and homogeneity, flexibility in the selection of compositions, and low temperature processing. The present invention fulfills this need.

SUMMARY OF THE INVENTION

The present invention resides in a process and apparatus for rapidly drying wet, porous gel monoliths of glass and ceramic that are substantially free of cracks, which function at relatively low temperatures and are relatively low in cost. In the case of silica, the gel is formed by reacting tetraethyl orthosilicate (TEOS) with water in a mold, which produces a porous silica gel matrix having a high concentration of microscopic pores. In the past, this gel matrix typically would simply be dried by heating in an enclosed container having small holes to produce the final silica monolith. However, that drying step has frequently led to undesired cracking of the monolith or has required unduly extended drying times. In accordance with the invention, cracking during the drying step is substantially eliminated by drying the gel in a special drying chamber assembly by immersing it in liquid solvent in the chamber, evacuating the liquid solvent by heating the chamber to displace the liquid solvent with solvent vapor, and increasing the temperature of the chamber at a predetermined rate until the gel is dry.

The rate of temperature increase of the drying chamber during the drying process is selected to provide rapid drying of the gel without cracking. Typically, a rate of increase of from 1° C./24 hours to 4° C./24 hours provides drying without cracking in a reasonable time, although in some cases rates as low as 0.1° C./24 hours may be used.

Optionally, during the drying step an inert gas (e.g., nitrogen) saturated with solvent vapor may be passed through the drying chamber. The solvent-saturated inert gas may be obtained by passing the gas through a solvent bath maintained at a temperature near the solvent's boiling point. The gas at this temperature then can be passed through the drying chamber as the chamber's temperature is being increased. Alternatively, prior to commencing the increase of temperature in the drying chamber the inert gas may be passed through the solvent bath and the chamber while the solvent bath's temperature is gradually decreased to room temperature. The drying chamber temperature is then increased while continuing the inert gas flow through the drying chamber.

Following drying of the gel, either with or without the inert gas, the temperature of the chamber is increased while pure inert gas is circulated through the chamber. The temperature is then further increased, to about 400° C., while air is circulated through the chamber to burn away any residual organic groups in the dry gel.

Other features and advantages of the present invention should become apparent from the following description of the preferred apparatus and processes, taken in conjunction with the accompanying drawing, which illustrates, by way of example, the principles of the invention.

BRIEF DESCRIPTION OF THE DRAWING

The FIGURE is a schematic drawing of apparatus for use in drying a strong gel monolith in accordance with the preferred process of the invention.

DESCRIPTION OF THE PREFERRED EMBODIMENT AND PROCESSES

Wet gels dried into glass or ceramic monoliths in accordance with the process of the present invention form monoliths that are free of cracks, can be processed at relatively low temperatures, and are relatively low in cost. The drying process is carried out under subcritical conditions of the pore fluid in the wet gel in a special drying chamber.

Wet gels of various shapes are formed by mixing a suitable alkoxide precursor with an alcohol, deionized water, and a suitable catalyst in predetermined proportions. The drying chamber and apparatus and the processes of the present invention are most suitable for drying of wet gels with high strengths. As the drying process is carried out under subcritical conditions of the pore fluid, pristine strengths of the wet gels should be high enough to withstand the capillary stress generated during the drying process. Techniques to prepare such wet gels have been described in copending and commonly-assigned patent application Ser. No. No. 811,326, which is incorporated by reference.

With specific reference to a silica monolith, tetraethyl orthosilicate (TEOS) is mixed with ethanol, deionized water, and a catalyst such as hydrofluoric acid (HF) a sol. The sol is poured in a cylindrical mold for gelling, which usually occurs within 4-6 hours, depending on the sol composition and the type of catalyst used. The gel is next aged at an elevated temperature for about a week, by which time the gel will have undergone substantial shrinkage away from the wall of the mold, thereby facilitating its easy removal. The wet gel is removed from the mold and submerged in a container of pure ethanol. The gel pore liquid is exchanged with ethanol by raising the temperature of the ethanol to about 60°-70° C. The wet gel is then dried using a drying chamber and process described in detail below.

As shown in FIG. 1, a drying chamber assembly 11 in accordance with the invention includes an inner container 13 and an outer container 15, both formed of a non-reactive material such as quartz. The inner container includes a cylindrical, vertically-oriented side wall 17 and an integral, circular top wall 19. A portion of the top wall projects outwardly from the side wall, to define a flange 21. Two inlet tubes 23 and 25, extend through the top wall, the first tube 23 being connected to a manometer 27 and the second tube 25 being connected through a valve 29 to three separate gas sources to be described below.

The outer container 15 includes a cylindrical side wall 31 and an integral, circular bottom wall 33. The side wall 31 is concentric with the inner container's side wall 17, and it has an inner diameter larger than the outer diameter of the inner container's side wall, so as to define between them a narrow annular space 35. A flange 37 projects outwardly from the upper end of the outer container's side wall 31. A side outlet tube 39 extends through the outer container's side wall, just below the flange 37, and an L-shaped dip tube 41 extends through the side outlet tube. The short end of the dip tube protrudes slightly from the outer end of the side outlet tube, and the long end of the dip tube extends downwardly, nearly to the bottom wall 33, immediately adjacent to the side wall 31. The outer end of the side outlet tube 39 is sealed around the dip tube. A short tube 42 connects the side outlet tube through a valve 43 to a condenser 45 and, in turn, to an ethanol reservoir 47. The outer end of the dip tube 41 protrudes outwardly from the outer end of the side outlet tube and is connected through another valve 49 to a pump 51 and, in turn, the same ethanol reservoir. The outer container 15 is located within a furnace heater 53.

In use, the outer container 15 is filled to a predetermined level with liquid ethanol, which is the same as the pore fluid in the gel. The wet gel monolith 55 is placed on an elevated platform 57 resting on the bottom wall 33 and submerged in the solvent. A small cover 59, preferably made of quartz or the like, is placed on the top surface of the gel, to restrict evaporation of pore fluid from that top surface.

The inner container 13 is then carefully lowered into the outer container 15 so that the respective flanges 21 and 37 are in contact. The inner and outer containers may then be secured together such as by attaching clamps 61 to the flanges. When the drying chamber assembly is so assembled, the inner container side wall 17 extends close to, but does not touch, the bottom wall 33 of the outer container.

At the beginning of the drying process, the valve 29 connecting the inlet tube 25 to the gas sources is closed, and the valve 49 connecting the outlet tube 39 to the pump 51 is closed. The valve 43 connecting the outlet tube to the condenser 45 is open. The furnace heater 53, having a programmable temperature control, is activated and the temperature of the ethanol solvent 54 located within the chamber assembly 11 is raised to its boiling point, i.e., about 78° C. The increasing vapor pressure of the ethanol forces the liquid ethanol into the narrow annular space 35 between the side walls 17 and 31 and outwardly through the outlet tube 39 and the tube 42 to the valve 43, condenser 45, and ethanol reservoir 47. This continues until the space within the inner container's side wall 17 is free of liquid ethanol and the only remaining liquid ethanol is located below the platform 57 and in the narrow annular space 35. At this time, the wet gel 55 is completely exposed to ethanol vapor.

When this condition is reached, the condenser valve 43 is closed and the pump valve 49 is opened, and the pump 51 then pumps the remaining liquid ethanol from the drying chamber assembly 11 to the ethanol reservoir 47. After the liquid ethanol has been fully pumped from the chamber, the valve 49 is closed and the valve 43 is opened. The chamber then is under a low positive pressure, as indicated by the manometer 27.

As previously mentioned, the inlet tube 25 connects the drying chamber assembly 11 with several sources of gas, which are used in subsequent steps of the drying process. These gas sources include an air source 63 and associated valve 65, a nitrogen source 67 and associated valve 69, and an ethanol bubbler 71 and associated valve 73. The ethanol bubbler itself is connected to the nitrogen source, such that it provides nitrogen saturated with ethanol vapor. A mantle heater 75 controls the ethanol bubbler's temperature.

The wet gel 55 may be dried using any of three alternative techniques. In a first technique, the heater 53 controllably heats the drying chamber assembly 11 at a predetermined rate from the initial temperature of 78° C., which is ethanol's boiling point. As this is done, the gel's appearance transforms from clear to opaque to clear, which finally indicates an absence of any remaining pore fluid. The gel is considered dry at this point. Thereafter the valves 29 and 69 are opened, to introduce pure nitrogen into the chamber, and the temperature is increased at a predetermined rate to 120° C. The resulting exhaust gases pass through the condenser 45 to the ethanol reservoir 47 and, in turn, a water bath 77. After reaching 120° C., the nitrogen valve 69 is again closed and the valve 65 is opened, to introduce air into the chamber, while the temperature is raised further to 400° C. Any residual chemically-bonded organic groups are burned in this step. The chamber is then cooled to room temperature and the dry monolithic gel is removed.

A second, alternative technique for drying the wet gel 55 involves the controllable raising of the drying chamber assembly's temperature, while supplying nitrogen saturated with ethanol vapor, but at a lower temperature. In this technique, the mantle heater 75 heats the ethanol bubbler 71 to a temperature of about 75° C., which is slightly less than ethanol's boiling point. Valves 29 and 73 are opened, whereby nitrogen continuously bubbles at a predetermined rate through the bubbler and is passed into the drying chamber assembly 11. The resulting exhaust gases pass through the condenser 45 to the ethanol reservoir 47 and, in turn, the water bath 77. While the temperature of the ethanol-saturated nitrogen remains constant at 75° C., the heater 53 controllably heats the chamber to raise its temperature at a predetermined rate to a predetermined temperature. When this temperature is reached, the gel is dry, having gone from clear to opaque to clear. Thus, a continuously-increasing drying force is provided.

After the gel 55 is dry, the bubbler 71 is bypassed by closing the valve 73 and opening the valve 69. Pure nitrogen gas thereby flows into the drying chamber assembly 11. The heater 53 then raises the chamber's temperature at a predetermined rate to 120° C. This ensures that any residual water also has been completely removed from the gel.

After reaching 120° C., the nitrogen gas flow is discontinued by closing the valve 69. Air is then introduced into the chamber by opening the valve 65, and the heater raises the chamber's temperature at a predetermined rate to about 400° C. Any residual chemically-bonded organic groups are thereby burned from the dry gel. The chamber is finally cooled to room temperature, and the dry monolithic gel removed.

A third, alternative technique for drying the wet gel 55 involves maintenance of the drying chamber's temperature at or near the ethanol solvent's boiling point, while controllably reducing the temperature of the ethanol in the bubbler 71, as nitrogen gas is passed through it to the drying chamber. In this technique, the mantle heater 75 initially heats the bubbler 71 to a temperature slightly less than ethanol's boiling point, i.e., to about 75° C. In contrast with the earlier-described process alternatives, however, the drying chamber's temperature is maintained at about 78° C., while the temperature of the ethanol bubbler, through which nitrogen is being passed, is decreased to room temperature at a predetermined rate. Drying of the gel is thus achieved by continuously decreasing the partial pressure of the ethanol in the nitrogen gas flowing around the gel body. After the ethanol bubbler has reached room temperature, the drying chamber temperature is increased at a predetermined rate, while maintaining the nitrogen flow through the bubbler constant at a predetermined rate, at which time the gel is dry. The remaining steps in the operational sequence are the same as in the first and second drying techniques described above.

The process of the invention will be better understood with reference to the following illustrative examples:

EXAMPLES 1-3

A sol was prepared by mixing 124.05 gm of TEOS, 81.23 gm of ethanol, 42.85 gm of deionized water, 1.17 gm of HCl, and 0.71 gm of HF acid. The sol was poured into a cylindrical mold of 250 cc volume. After aging and solvent exchange in ethanol, a number of these wet gels were successively loaded into the drying chamber assembly 11 described above. The wet gels typically were 4.0 cms. in diameter and 23 cms. in length. The chamber was then heated to 78° C. to create sufficient vapor pressure to expel most of the liquid solvent from the chamber, via the side outlet tube 39 and the tube 42, after which the remaining liquid solvent was pumped out, via the dip tube 41.

In Example 1, several wet gels were held in the drying chamber after pump-out of the liquid ethanol was completed, and the temperature of the chamber was then increased from t78° C. to 90° C., at a rate of 4° C./24 hours. The temperature of the bubbler 71 was maintained at 75° C., and 100 sccm of nitrogen was bubbled through it continuously. Upon reaching 90° C., the sample gels were dry and monolithic. The temperature of the chamber was then raised from 90° C. to 120°

C., at a rate of 3° C./hour, under pure nitrogen flow. Nitrogen was shut off and air was introduced into the chamber at 120° C. The temperature then was raised from 120° C. to 400° C., at a rate of 3° C./hour, for organic burning. Finally, the chamber was cooled to room temperature and the monolithic dry gels were removed.

In Example 2, several wet gels were held in the drying chamber after pump-out of the liquid ethanol was completed, and the temperature of the chamber 11 was held constant at 78° C., while the temperature of the bubbler 71 was reduced from 75° C. to room temperature, at the rate of 10° C./24 hours. The nitrogen flow through the bubbler was maintained constant at 100 sccm. After reaching room temperature in the bubbler, the temperature of the drying chamber was raised from 78° C. to 90° C., at the rate of 4° C./24 hours. The remainder of the steps were the same as in Example 1. All the gels were monolithic and dry at the end of the process.

In Examples 1 and 2, the wet gels underwent a shrinkage of 25-30% as the temperature was increased from 78° C. to 85° C. The gels remained transparent and evaporation of solvents took place at the gel surface. The shrinkage stopped at 85° C. and, as the temperature was raised further, the gels turned opaque. The opacity, which started at the center of the gel body and moved out towards the surface, indicated evaporation of solvents inside the gel body. The gels were observed to be transparent once again as the temperature was increased to 90° C., indicating that the gels were completely dry. The chamber 11 operated under a positive pressure of about 2.0 inch water column throughout the drying operation.

In Example 3, several wet gels were held in the drying chamber after pumping out of the liquid ethanol had been completed, and the temperature of the drying chamber was then increased from 70° C. to 90° C., at a rate of 4° C./24 hours, but without the flow of any inert gas through the bubbler 71 into the chamber 11. The valve 29 remained closed. The chamber operated under a positive pressure of about 2.0 inch water column throughout the drying process. All the gels were dry and monolithic when 90° C. was reached. The shrinkage behavior of the gels was similar to that of the gels of Examples 1 and 2. The gels underwent similar transitions through transparency-opacity-transparency as the temperature was increased, but the opacity in this example started at the surface and moved inwardly to the center, in contrast with Examples 1 and 2.

The dry gel monoliths of Examples 1, 2, and 3 typically were 2.2 cm in diameter and 13.0 cm in length. No cracks were identified in any of the dry gels.

EXAMPLE 4

A sol was prepared by mixing 496.22 gm of TEOS, 324.93 gm of ethanol, 171.4 gm of deionized water, 2.86 gm of HF acid, and 4.69 gm of HCl acid. The sol was poured into a cylindrical mold of 1000 cc volume. After aging and solvent exchange in ethanol, the wet gel, 6.3 cm in diameter and 33.0 cm in length, was placed in the drying chamber assembly 11.

The gel was dried in accordance with the process described in Example 1, except that the rate of temperature increase from 78° C. to 90° C. was reduced to 2° C./24 hours. The dried gel monolith was 3.6 cm in diameter and 19.4 cm in length and was free of cracks.

EXAMPLE 5

A gel was prepared as in Example 4 and, after aging and solvent exchange, was dried in accordance with the process described in Example 2, except that the rate of temperature increase from 78° C. to 90° C. was reduced to 2° C./24 hours. The dried gel monolith was 3.6 cm in diameter and 19.4 cm in length and was free of cracks.

EXAMPLE 6

A gel was prepared as in Example 4 and, after aging and solvent exchange, was dried in accordance with the process described in Example 3, except that the rate of temperature increase from 78° C. to 90° C. was reduced to 2° C./24 hours. The dried gel monolith was 3.6 cm in diameter and 19.4 cm in length and was free of cracks.

EXAMPLE 7

A sol was prepared by mixing 992.44 gm of TEOS, 649.86 gm of ethanol, 342.8 gm of deionized water, 5.72 gm of HF acid, and 9.39 gm of HCl acid. This sol was poured into a cylindrical mold of 2000 cc volume. After aging and solvent exchange in ethanol, the wet gel of approximate diameter 8.2 cm and length 41.5 cm was loaded into the drying chamber assembly 11. The gel was dried in accordance with the process described in Example 1, except that the rate of temperature increase from 78° C. to 90° C. was reduced to 2° C./24 hours. The dried gel monolith was 4.7 cm diameter and 24.4 cm in length and was free of cracks.

EXAMPLE 8

A gel was prepared as in Example 7 and, after aging and solvent exchange was dried in accordance with the process described in Example 2, except that the rate of temperature increase from 78° C. to 90° C. was reduced to 2° C./24 hours. The dried gel monolith was 4.7 cm in diameter and 24.4 cm in length and was free of cracks.

EXAMPLE 9

A gel was prepared as in Example 7 and, after aging and solvent exchange, was dried in accordance with the process described in Example 3, except that the rate of temperature increase from 78° C. to 90° C. was reduced to 2° C./24 hours. The dried gel monolith was typically 4.7 cm in diameter and 24.4 cm in length and was free of cracks.

EXAMPLE 10

A sol was prepared by mixing 1488.7 gm of TEOS, 974.788 gm of ethanol, 514.2 gm deionized water, 8.58 gm of HF acid, and 14.08 gm of HCl acid. The sol was poured into a cylindrical mold of 3000 cc volume. After aging and solvent exchange in ethanol, the wet gel was loaded into the drying chamber assembly 11. The wet gel was 10.0 cm in diameter and 38.3 cm in length. The gel was dried in accordance with the process described in Example 1, except that the rate of temperature increase from 78° C. to 90° C. was limited to 2° C./24 hours for the range 78° C. to 84° C. and 1° C./24 hours for the range 84° C. to 90° C. The resulting monolithic dry gel had a diameter of about 5.8 cm and a length of 22.2 cm and was free of cracks.

EXAMPLE 11

A gel was prepared as in Example 10 and dried in accordance with the process of Example 2, except that the rate of temperature increase from 78° C. to 90° C.

was limited to 2° C./24 hours for the range 78° C. to 84° C. and 1° C./24 hours for the range 84° C. to 90° C. The resulting monolithic dry gel had a diameter of about 5.8 cm and a length of 22.2 cm and was free of cracks.

EXAMPLE 12

A gel was prepared as in Example 10 and dried in accordance with the process of Example 3, except that the rate of temperature increase from 78° C. to 90° C. was limited to 2° C./24 hours for the range 78° C. to 84° C. and 1° C./24 hours for the range 84° C. to 90° C. The resulting monolithic dry gel had a diameter of about 5.8 cm and a length of 22.2 cm and was free of cracks.

EXAMPLES 13–16

Wet gels of 250 cc, 1000 cc, 2000 cc, and 3000 cc prepared as in Examples 1, 4, 7, and 10 respectively were placed inside a large cylindrical container. The mouth of the container was tightly closed with a thin foil of plastic. In accordance with a process of the prior art, a few pinholes were opened in the plastic foil, and the container was placed inside an oven. The temperature of the oven was raised from room temperature to 90° C. at a rate of 2° C./24 hours. All the gels cracked and it was not possible to fabricate monolithic dry gels of these sizes.

It should be appreciated that the present invention provides an improved process and apparatus for drying large gel monoliths without risk of cracking. The drying is achieved by isolating the gel monolith in a solvent vapor environment, with the partial vapor pressure being provided by the same solvent as is present in the gel pores. Controllably manipulating the solvent's partial vapor pressure correspondingly increases the driving force for the drying process.

Although the invention has been described in detail with reference only to the preferred apparatus and processes, those skilled in the art will appreciate that various modifications can be made without departing from the invention. Accordingly, the invention is defined only with reference to the following claims.

We claim:

1. A process for drying a wet, porous gel monolith, comprising the steps of:
    immersing the gel monolith in a solvent located in a drying chamber having an exit port;
    raising the temperature of the drying chamber to substantially the boiling point of the solvent, to produce a solvent vapor in any empty space of the drying chamber;
    removing the liquid solvent from the drying chamber such that the wet gel monolith remains in the drying chamber under a predetermined positive pressure of the solvent vapor; and
    drying the gel by maintaining the drying chamber at a temperature of at least substantially the solvent boiling temperature, to evaporate the solvent located in the pores of the gel monolith, the evaporated solvent exiting the drying chamber through the exit port.

2. A process as defined in claim 1, wherein:
    the drying chamber further includes an inlet port; and
    the step of drying includes a step of introducing into the drying chamber via the inlet port, an inert gas having a controlled solvent partial pressure.

3. A process as defined in claim 2, wherein:
    the step of introducing includes a step of maintaining the inert gas being introduced at a solvent partial pressure corresponding substantially to the solvent boiling temperature, at atmospheric pressure; and
    the step of drying includes a step of controllably increasing the temperature of the drying chamber from a temperature substantially equal to the solvent boiling temperature, until the gel monolith is substantially dry.

4. A process as defined in claim 3, wherein the step of controllably increasing includes a step of controllably increasing the temperature at a rate of at least 0.1° C. per 24 hours.

5. A process as defined in claim 2, wherein the step of drying includes steps of:
    maintaining the drying chamber at a temperature substantially equal to the solvent boiling temperature; and
    controllably reducing the partial pressure of the solvent in the inert gas being introduced into the drying chamber by reducing the temperature of the solvent from a temperature substantially equal to the solvent boiling temperature.

6. A process as defined in claim 5, wherein the step of controllably reducing includes a step of controllably reducing the temperature at rate of at least about 0.1° C. per 24 hours.

7. A process as defined in claim 2, wherein the step of drying further includes a step of passing a dry inert gas through a solvent bath having a selected temperature, to produce the inert gas with a predetermined partial pressure of the solvent.

8. A process as defined in claim 2, wherein the step of introducing includes a step of introducing the inert gas at a flow rate of at least 1 sccm.

9. A process defined in claim 2, wherein:
    the solvent used in the step of immersing is ethanol;
    the inert gas used in the step of introducing is nitrogen; and
    the step of drying maintains the drying chamber at a temperature of at least about 75° C.

10. A process as defined in claim 1, wherein:
    the drying chamber further includes an inlet port;
    the process includes a further step of directing an inert gas through the drying chamber, from the inlet port to the exit port, while increasing the temperature of the drying chamber at a controlled rate.

11. A process as defined in claim 10, and further including the steps of:
    removing any residual water in the dry gel monolith by directing an inert gas through the drying chamber, from the inlet port to the exit port, while increasing the temperature of the drying chamber at a controlled ráte to a predetermined temperature above 100° C.; and
    burning away any residual, chemically-bonded organic groups in the dry gel monolith by directing air through the drying chamber, from the inlet port to the exit port, while increasing the temperature of the drying chamber at a controlled rate to a substantially higher temperature.

12. A process defined in claim 11, wherein:
    in the step of removing, the temperature is raised to about 120° C., at a rate of at least about 0.1° C. per hour; and
    in the step of burning, the temperature is raised to about 400° C., at a rate of at least 0.1° C. per hour.

13. A process as defined in claim 1, wherein the step of drying occurs in the absence of a flow of gas through the drying chamber.

14. A process as defined in claim 1, wherein the step of drying is terminated when the gel appearance has transformed from transparent to opaque to transparent.

15. A process for drying a wet, porous gel monolith having a liquid solvent in its pores, comprising the steps of:

placing the wet gel monolith in a chamber having an inlet port and an outlet port;

heating the chamber to a temperature at or near the solvent's boiling point, such that the free space of the chamber is filled substantially only with solvent vapor;

passing through the chamber, from the inlet port to the outlet port, an inert gas having a predetermined solvent partial pressure and having a predetermined temperature; and regulating the temperature of the chamber and the partial pressure of the solvent vapor in the inert gas so as to controllably increase the driving force for drying the liquid solvent from the pores of the wet gel.

16. A process as defined in claim 15, wherein the step of regulating includes the step of controllably increasing the temperature of the chamber while maintaining substantially constant the solvent partial pressure of the inert gas.

17. A process as defined in claim 15, wherein the step of regulating includes the step of controllably decreasing the solvent partial pressure in the inert gas while maintaining substantially constant the temperature of the chamber.

18. A process as defined in claim 15, wherein:

the step of placing includes a step of submerging the wet gel monolith in liquid solvent; and the step of heating includes a step of removing from the chamber substantially all of the liquid solvent.

* * * * *